United States Patent
Chen

Patent Number: 5,938,499
Date of Patent: *Aug. 17, 1999

[54] ELASTIC GEL TOY

[75] Inventor: John Y. Chen, Pacifica, Calif.

[73] Assignee: Applied Elastomerics, Inc., S. San Francisco, Calif.

[*] Notice: This patent is subject to a terminal disclaimer.

[21] Appl. No.: 08/845,809

[22] Filed: Apr. 29, 1997

Related U.S. Application Data

[63] Continuation-in-part of application No. PCT/US94/04278, Apr. 19, 1994, and a continuation-in-part of application No. 08/152,734, Nov. 15, 1993, Pat. No. 5,624,294, and a continuation-in-part of application No. 08/719,817, Sep. 30, 1996, and a continuation-in-part of application No. 08/665,343, Jun. 17, 1996, and a continuation-in-part of application No. 08/612,586, Mar. 8, 1996.

[51] Int. Cl.⁶ .................................................. A63H 1/32
[52] U.S. Cl. ........................ 446/253; 446/486; 446/490
[58] Field of Search .................... 446/253, 486, 446/490, 254; 473/576, 575

[56] References Cited

U.S. PATENT DOCUMENTS

| | | | |
|---|---|---|---|
| 3,731,929 | 5/1973 | Landry | 473/576 |
| 4,962,926 | 10/1990 | Chen | 446/490 X |
| 4,991,841 | 2/1991 | Parranto | 446/490 X |
| 5,282,777 | 2/1994 | Myers | 446/576 X |
| 5,624,294 | 4/1997 | Chen | 446/253 |

OTHER PUBLICATIONS

"The slymee Hand" Dan Brechner & Co., Inc., Amusement Business, Jun. 28,1986, p.13 A.

*Primary Examiner*—Robert A. Hafer
*Assistant Examiner*—Jeffrey D. Carlson

[57] ABSTRACT

A novel elastic gel toy for play including at least one elastic gel body having at least one elastic gel rod extending from opposite sides of the elastic gel body along a selected axis of rotation, said gel body the said gel rod capable of withstanding an elongation of at least 50% during play. The body suspended on the gel rod are also suitable for undulating up, down, around, sideways, and lateral back and forth play.

3 Claims, 8 Drawing Sheets

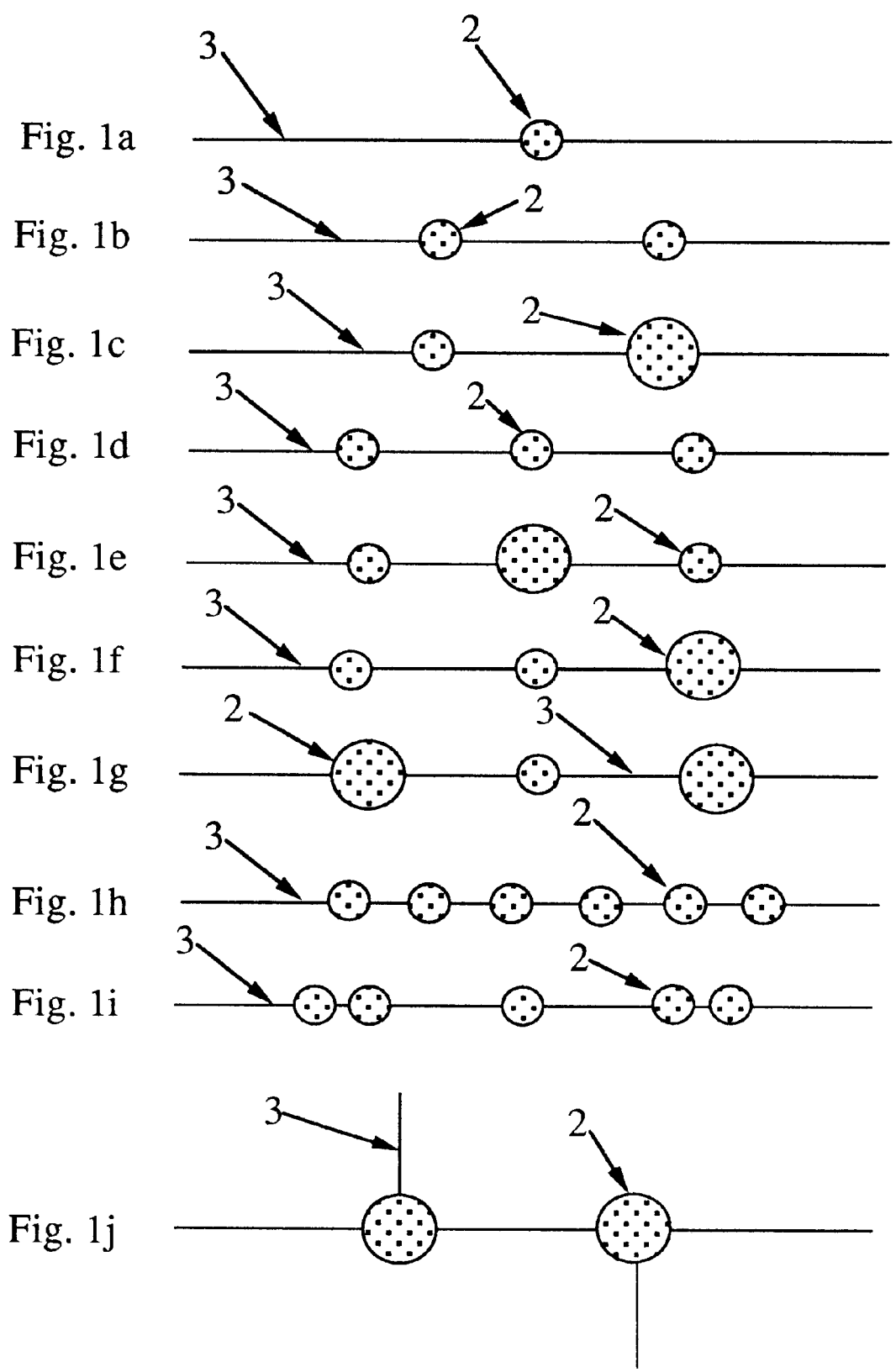

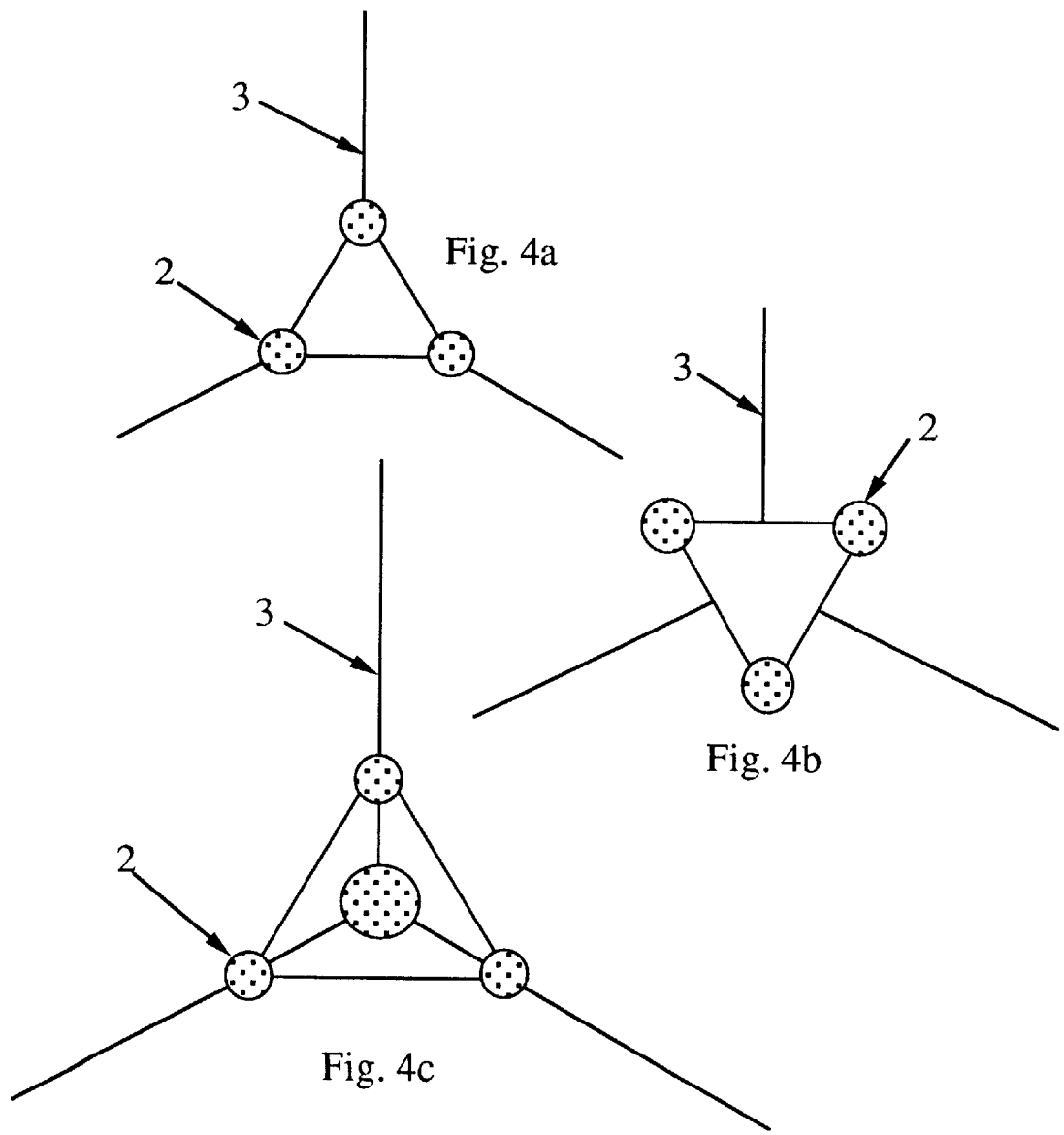

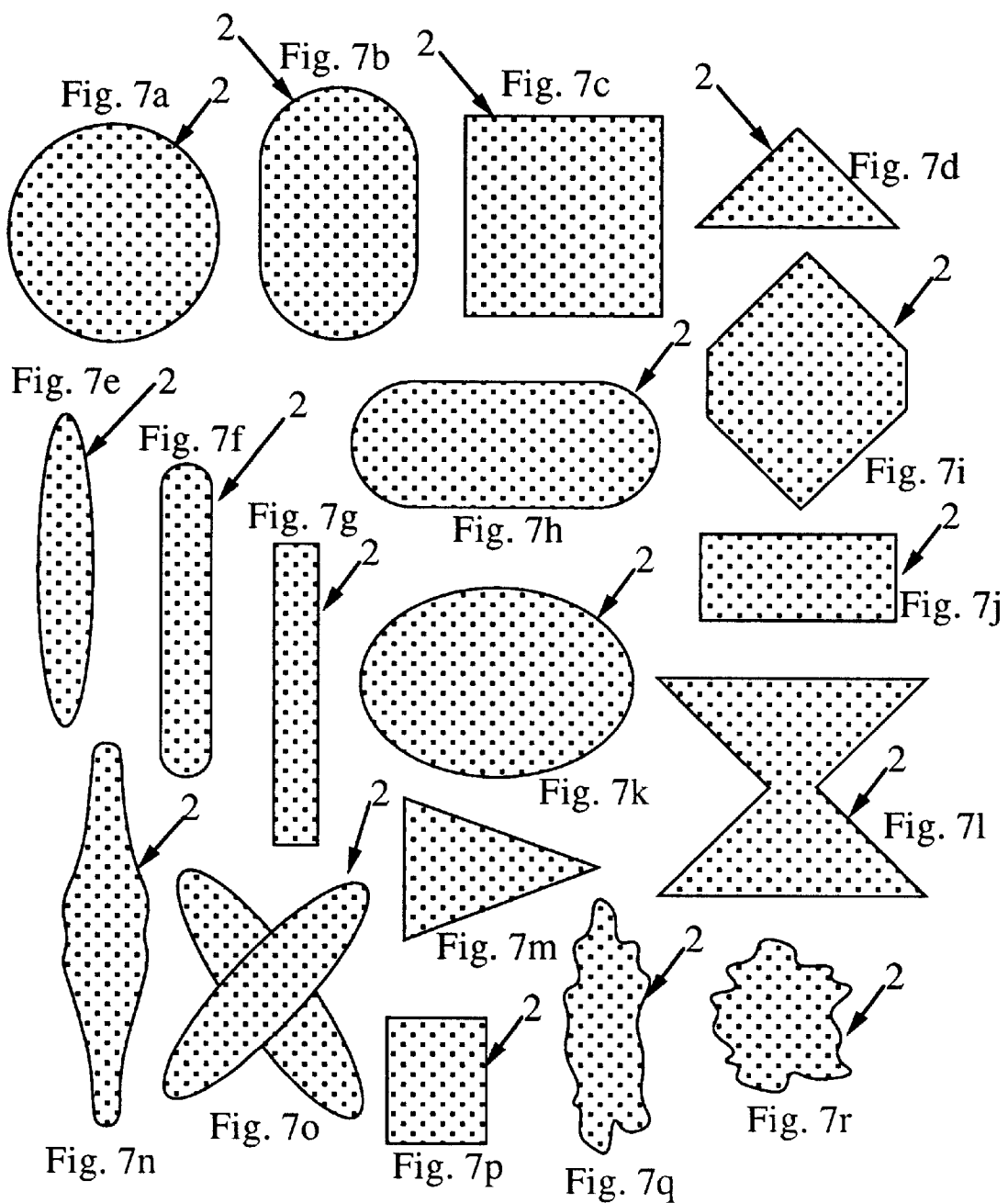

ELASTIC GEL TOY

REFERENCE TO RELATED APPLICATIONS AND PATENTS

This application is a CIP application of copending applications: PCT/US94/04278 filed Apr. 19, 1994; Ser. No. 08/152,734 filed Nov. 15, 1993 now U.S. Pat. No. 5,624, 294; Ser. No. 08/719,817 filed Sep. 30, 1996; Ser. No. 08/665,343 filed Jun. 17, 1996 and Ser. No. 08/612,586 filed Mar. 8, 1996. The subject matter contained in the related applications and patents are specifically incorporated herein by reference.

FIELD AND BACKGROUND OF THE INVENTION

The present invention relates to elastic gel toys.

SUMMARY OF THE INVENTION

I have unexpectedly discovered novel elastic gel spinning toys comprising at least one highly elastic gel body having at least one elastic gel rod threaded through said elastic gel body along a selected axis of rotation, said gel body and said gel rod capable of withstanding an elongation of at least 50% during spinning. The bodies suspended on the gel rods are also suitable for undulating up, down, around, sideways, and lateral back and forth play.

The various aspects and advantages of the gel toys of the invention will become apparent to those skilled in the art upon consideration of the accompanying disclosure and the drawings.

DESCRIPTION OF THE DRAWINGS

FIG. 1. Representative views of gel bodies connected by gel rods of the invention.

FIGS. 2–6. Representative views of more gel bodies connected by gel rods of the invention.

FIG. 7. Representative views of various shaped gel bodies connected by gel rods of the invention.

DESCRIPTION OF THE PREFERRED EMBODIMENTS

Figure 2A:
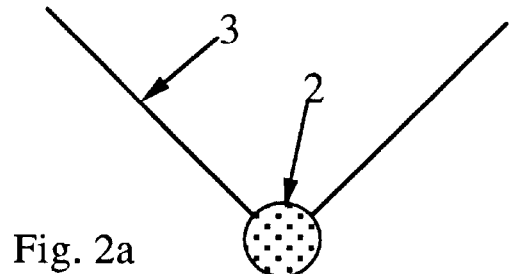
Figure 2B:
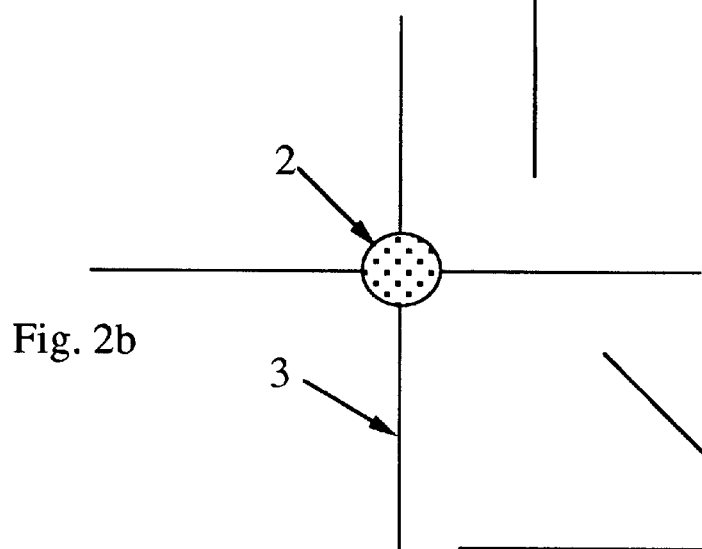
Figure 2C:
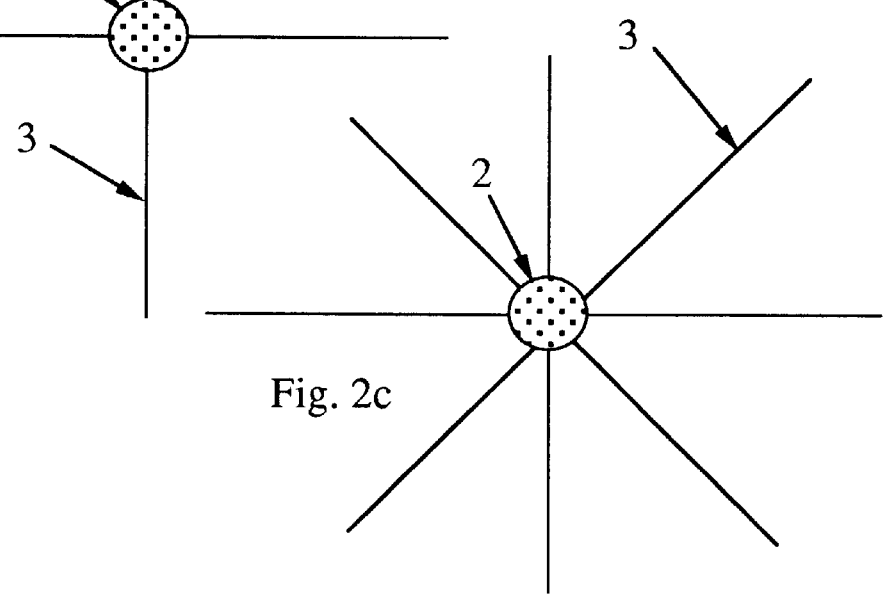
Figure 3A:
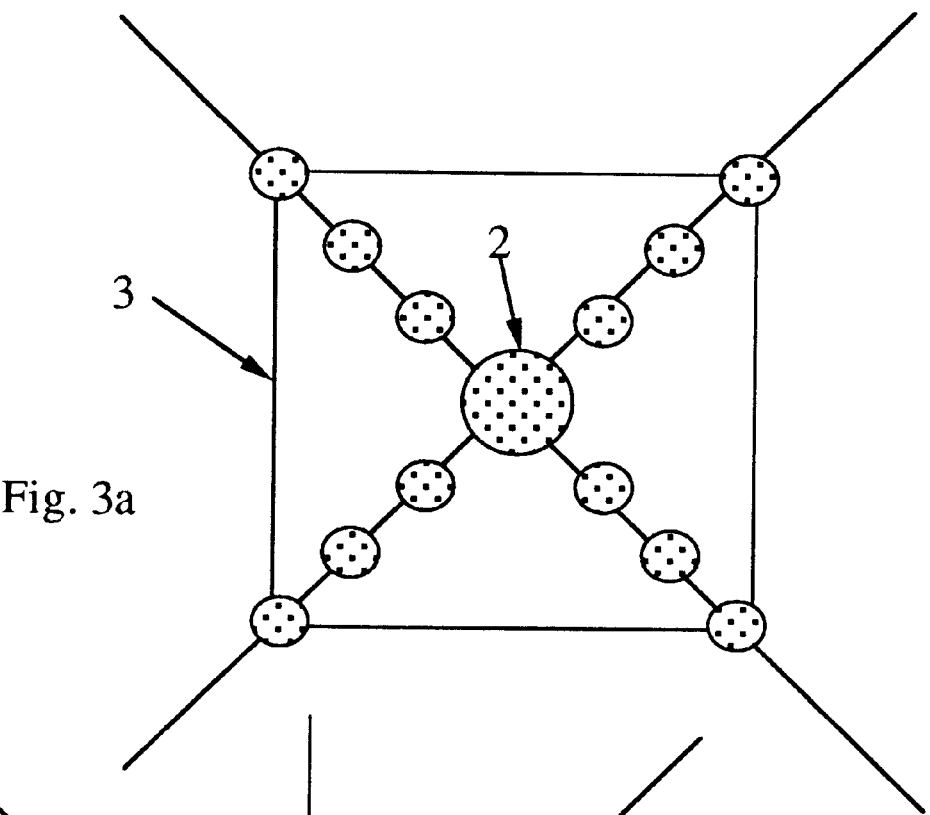
Figure 3B:
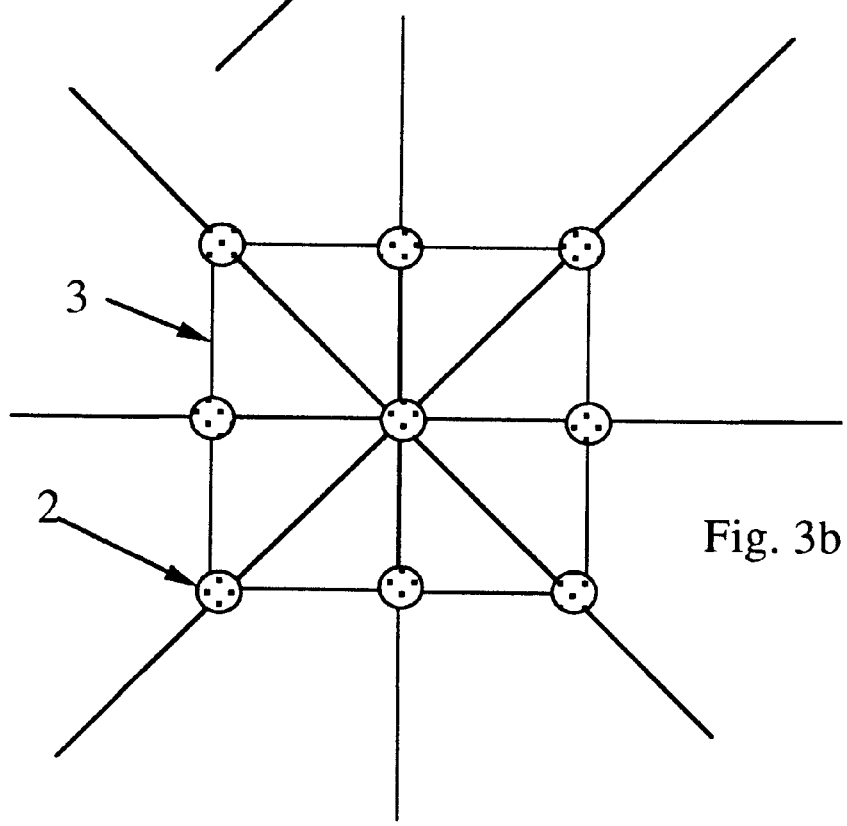
Figures 5A, 5B:
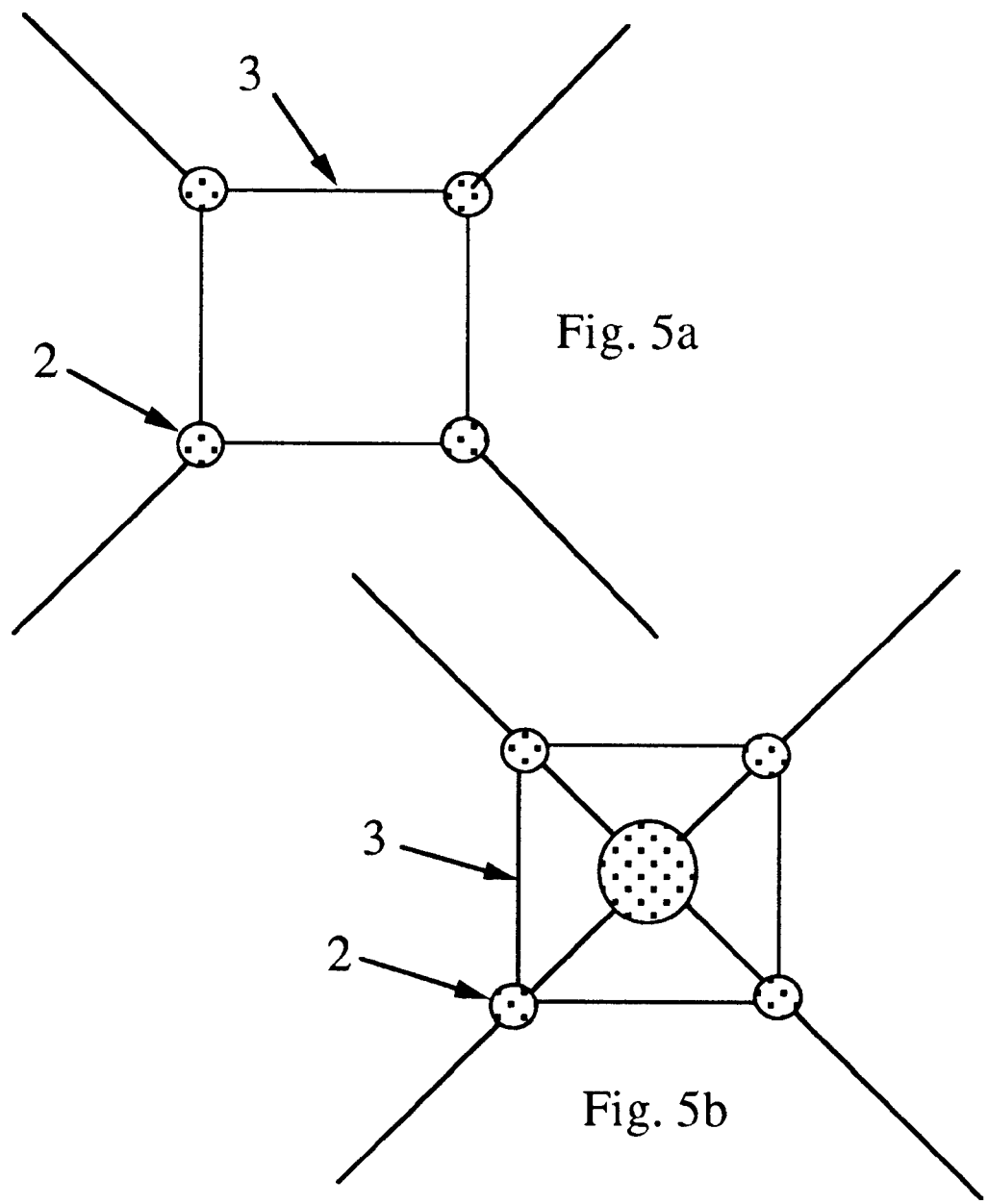
Figure 6A:
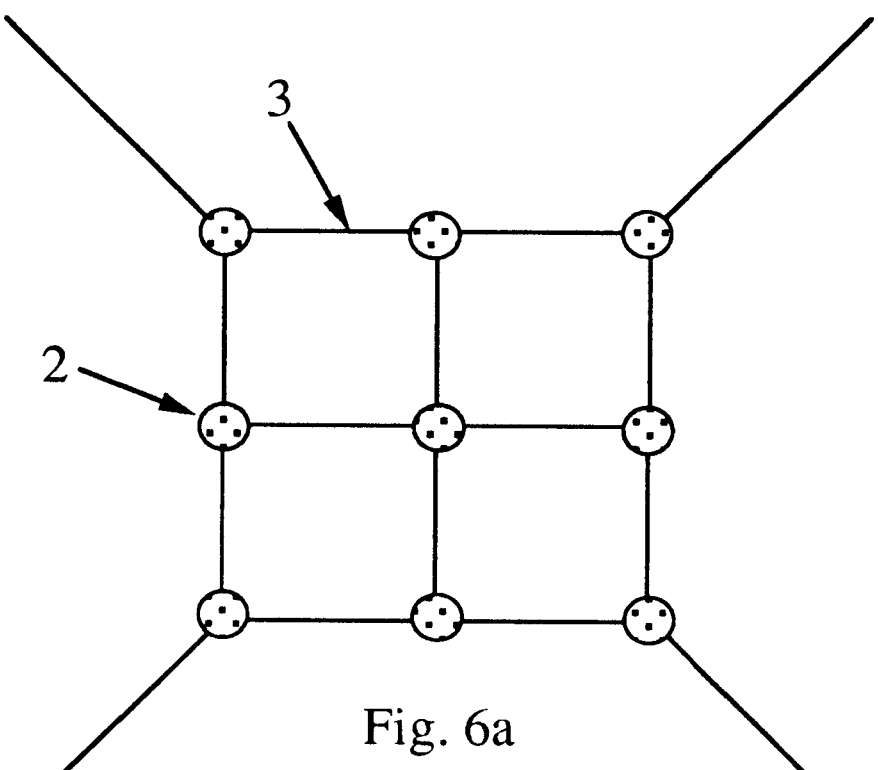
Figure 6B:
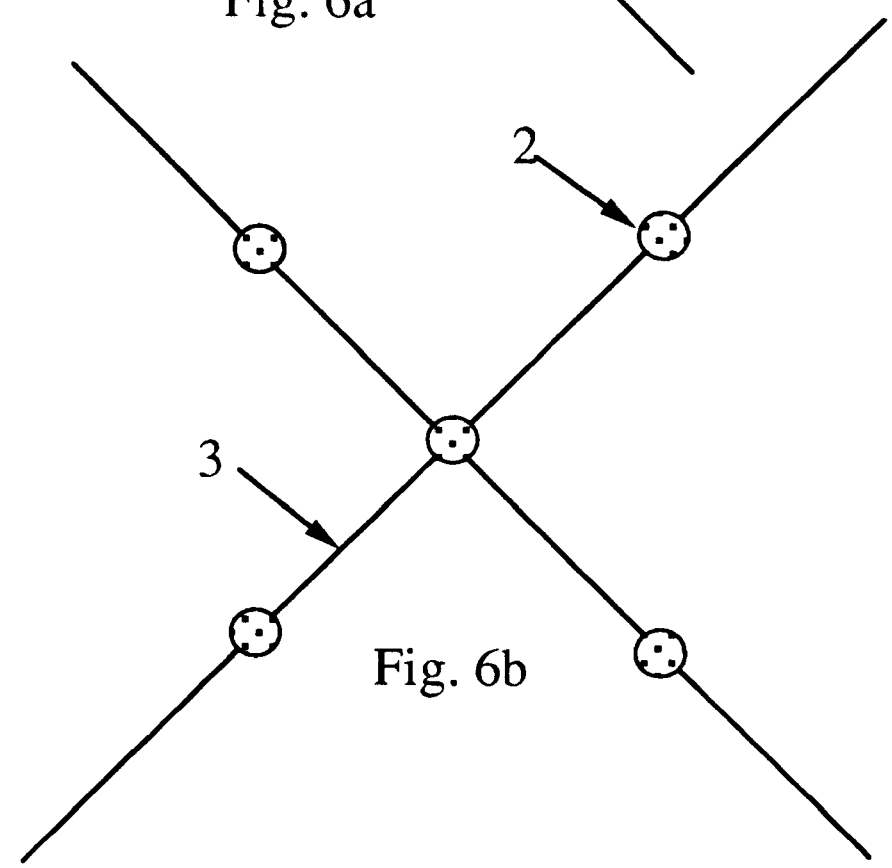
Figure 8A:
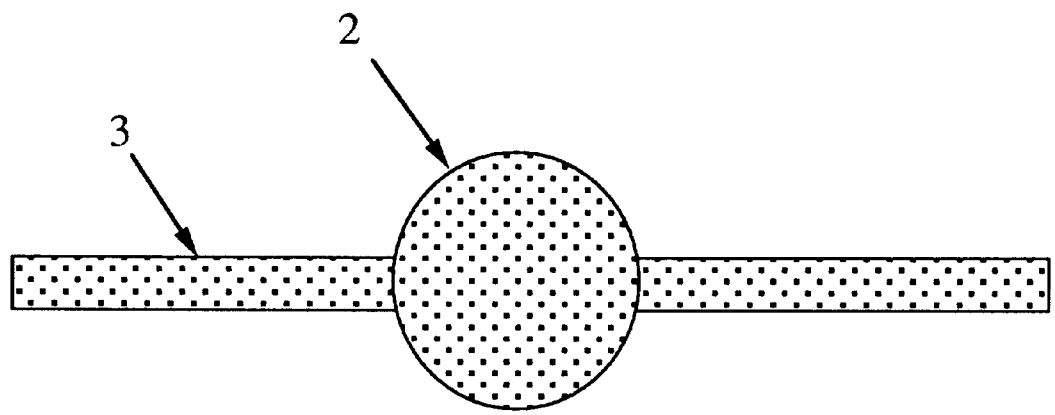
FIG. 8. Representative expanded large views of a sphere shaped gel body connected by a gel rod of the invention with its shaped sphere volume deformed during spinning.
Figure 8B:
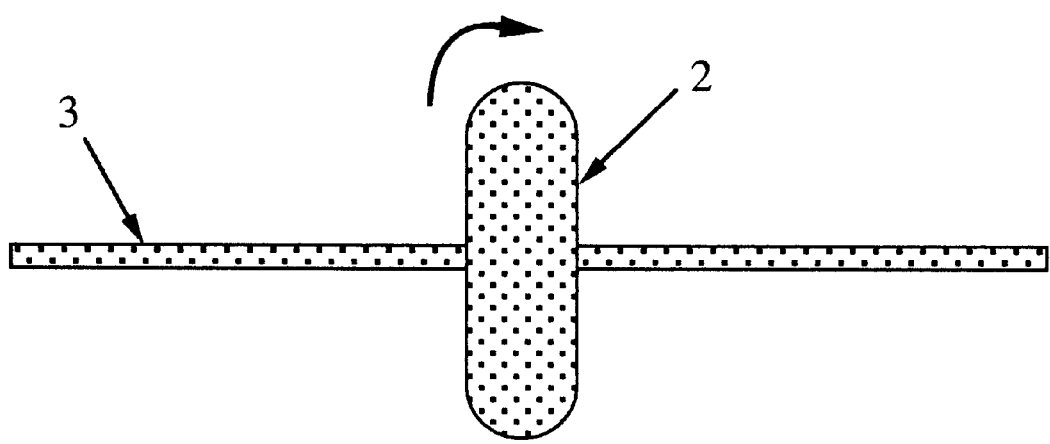

The toys of the invention comprises one or more gel bodies 2; and each gel body 2 having at least one elastic gel rod 3 threaded through the gel body 2 transversely along a selected axis of rotation of the gel body 2. The gel rod is threaded through the gel body by forcibly inserting the gel rod through the gel body's axis at the point along the selected axis of rotation. At the point of insertion through the gel body, the gel body collapses onto the gel rod to form a very tight slidable fit between the gel rod and the gel body. The collapsing of the gel body onto the gel rod is much like capturing of the gel rod by the gel body, but the rod being capable of sliding in the direction of strong pull. This allows the gel body to be positioned along any part of the gel rod. Furthermore, since the gel body and gel rod are made of the same gel material, the gel rod and body can be formed as one piece in the same mold without the additional step of insertion of the rod into the gel body before play.

Due to the highly elastic nature of the gel bodies, they are deformed by the centrifugal force as the rate of rotation is increased. The inherent deformations associated with the elastic gel bodies are not encountered with rigid materials used in conventional string spinning-disk toys.

The gel bodies are not rigid bodies; but are highly elastic and dynamically deformable under rotation. They are easily deformed under very low to moderate shear and stress forces. The gel bodies of the invention when rotated about an axis of rotation will experience increase deformation from its original shapes with increase rate of rotation. The deformation of the gel bodies of the invention under rotation is a nonuniform phenomena and is substantially independent of its original shape. Irrespective of the original shapes of the gel bodies, when subjected to rotational forces, the gel bodies will deform in a highly elastic, predetermined, nonuniform, and non-radial manner. Because of the high deformations resulting from rotational forces, the gel bodies will redistribute its mass outwardly by elongating perpendicularly with respect to its axis of rotation.

The shape of the gel bodies of the invention may be of any suitable solid shape, such as a sphere, a hemisphere, a spherical triangle, a spherical segment, a spherical sector, a curved volume of a right cylinder, a curved volume of a right cone, an oblate spheroid, an oblate hemispheroid, a semi-hemispheroid, a quai-hemispheriod, a prolate, a spheroid, a prolated hemispheroid, a frustum of right circular cone, a solid lune, or an ellipsoid, and the like.

Other shapes of gel bodies of the gel toys of the invention include: a cube, a rectangular solid, a parallelogram solid, a rhombus solid, a trapezoid solid, a general quadrilateral solid, a rectangular parallelepiped, a prism, a truncated triangular prism, a pyramid, a frustum of pyramid, a bifolium solid, an evolute solid, a lemniscate of Bernoulli, two-leaved rose solid, a nephroid solid, a three-leaved rose curve solid, a four-leaved rose curve solid, an elliptic paraboloid, a hyperbolic paraboloid, a hyperboloid, a tetrahedron, an octahedron, an icosahedron, a dodecahedron, an ellipsoid, a spheroid, an oblate spheroid, or a prolate spheroid, and the like.

The shapes of the gel rods 3 of the invention can be any long shape and the cross-section of the rods can be any shape including rectangular, parallelogram, rhombus, trapezoid, general quadrilateral, prism, tetrahedron, octahedron, icosahedron, dodecahedron, ellipsoid, round, square, and the like.

Any axis of the gel bodies may be chosen as the axis of rotation. The gel bodies may be of any suitable size, from less than 1 cubic centimeter to 20 cubic centimeter or greater.

In the operation of the toys of the invention, the gel rod is held at the ends by the hands and twirled in one direction to store up an increasing number of twist in the gel rod. This is made possible by the spin of the gel body imparted by the twirling action of the gel rod. When the twirling stops, the twisting energy stored up in the gel rod releases and spins the gel body. The rotation imparted to the gel body continues to spin in one direction and reverses and spin in the opposite direction and so on and so forth until all of the torsion energy in the gel rod dies out. The elongated gel body and gel rod can withstand an elongation of at least 50% or more.

The operation of the gel toys of the invention can be ready observed under strobe light. The number of revolutions per minute may be counted in this way. The changes in radius can be measured. The change in gel body shape can be observed and measured. The centrifugal force acting on the rotating gel body can be likewise determined at any instant of time, at any instant rate of rotation, at any instant change in gel body shape. The perpendicular-axis elongation effect of the gel body can be view under strobe light; its regions of deformation and redistribution of mass can be viewed, measured and determined by grid markings on the gel body.

One or more gel bodies suspended on the gel rod can be moved and positioned on any part of the gel rod by pulling the gel rod through the gel bodies. The bodies so suspended can be undulated up, down, around, sideways, and used to demonstrate one dimensional wave action. Two dimensional wave action is demonstrated by a spider's wed plane of suspended gel bodies on gel rods. Three dimensional wave action is demonstrated by a network of gel bodies on a structure of gel rods connected at gel body points. One, two, and three dimensional structures can be formed with the gel bodies connected by gel rods and used in undulating up, down, around, sideways, and lateral back and forth play.

The gel compositions making up the gel bodies and gel rods of the invention may be made from almost any of gel materials including polymer gels, crosslink polymer gels, silicone gels, urethane gels, water based hydrogel, and the like. Most of these gels are inherently weak and do not make good gel bodies by themselves; they can not withstand the centrifugal force generated during rotation. Weak gels can be enclosed by the stronger more advantageous gels.

Gels especially suitable and advantageous for use in making gel bodies and gel rods of the invention and the methods of making such gels are described in patents: U.S. Pat. Nos. 5,333,646; 5,239,723; 5,336,708; 5,262,468; 5,324,222; 5,153,254; 5,624,294; 5,508,334; 5,475,890; 5,655,947 and patent application No.: PCT/US94/04278 which are incorporated herein by reference.

Various patents on thermoplastic elastomers are described in U.S. Pat. Nos. 3,595,942; 3,772,234; 4,116,917; 4,687, 815 Reissue no. 27,145 and 28,236.

The most suitable and advantageous polymers forming the gel body and rod of the invention have the more general configuration A-B-A wherein each A is a glassy polymer end block segment of polystyrene; and B is a elastomeric midblock. The midblock and polystyrene portions are incompatible and form a two or more phase system consisting of sub-micron domains of glassy polystyrene interconnected by flexible midblocks. These domains serve to crosslink and reinforce the structure. This physical elastomeric network structure is reversible, and heating the polymer above the softening point of polystyrene temporarily disrupt the structure, which can be restored by lowering the temperature.

Still other polymers useful in forming the gel bodies and rods of the invention include linear sequential block copolymers (S-EP-S), (S-EB-S), (S-E-S), (S-B-S), (S-EP-EB-S), (S-EP-EB-EP-EB-S), (S-E-EB-S), (S-E-EP-S), (S-B-EP-S), (S-B-EB-S), (S-E-EP-E-S), (S-E-EB-B-S), (S-B-EP-B-S), (S-B-EB-B-S), (S-E-B-EB-S), (S-E-B-EP-S), (S-EB-EP-S), (S-E-EB-EP-S), (S-E-EP-EB-S), (S-B-EB-EP-S), (S-B-EP-EB-S), (S-E-EP-E-EP-S), (S-E-EP-E-EB-S), (S-EP-B-EP-S), (S-B-EB-B-EB-S), (S-B-EB-B-EP-S), (S-E-EB-B-EP-S), (S-E-EP-B-EB-S), (S-E-EP-E-EP-E-S), (S-B-EP-B-EP-B-S), (S-E-EP-E-E-B-S), (S-E-EP-E-EP-EB-S), (S-E-EP-E-EP-E-S), (S-E-EP-EB-EP-EB-B-S), (S-E-EP-EB-EP-EB . . . -S); counterpart coupled block copolymers: (S-EP-S)$_n$, (S-EB-S)$_n$, (S-E-S)$_n$, (S-B-S)$_n$, (S-EP-EB-S)$_n$, (S-EP-EB-EP-EB-S)$_n$, (S-E-EB-S)$_n$, (S-E-EP-S)$_n$, (S-B-EP-S)$_n$, (S-B-EB-S)$_n$, (S-E-EP-E-S)$_n$, (S-E-EB-B-S)$_n$, (S-B-EP-B-S)$_n$, (S-B-EB-B-S)$_n$, (S-E-B-EB-S)$_n$, (S-E-B-EP-S)$_n$, (S-EB-EP-S)$_n$, (S-E-EB-EP-S)$_n$, (S-E-EP-EB-S)$_n$, (S-B-EB-EP-S)$_n$, (S-B-EP-EB-S)$_n$, (S-E-EP-E-EP-S)$_n$, (S-E-EP-E-EB-S)$_n$, (S-EP-B-EP-S)$_n$, (S-B-EB-B-EB-S)$_n$, (S-B-EB-B-EP-S)$_n$, (S-E-EB-B-EP-S)$_n$, (S-E-EP-B-EB-S)$_n$, (S-E-EP-E-EP-E-S)$_n$, (S-B-EP-B-EP-B-S)$_n$, (S-E-EP-E-EB-S)$_n$, (S-E-EP-E-EP-EB-S)$_n$, (S-E-EP-EB-EP-EB-S)$_n$, (S-E-EP-EB-EP-EB . . . -S)$_n$ and counter part multifunctional block copolymers: (R)$_n$-EP-S, (R)$_n$-EB-S, (R)$_n$-E-S, (R)$_n$-B-S, (R)$_n$-EP-EB-S, (R)$_n$-EP-EB-EP-EB-S, (R)$_n$-E-EB-S, (R)$_n$-E-EP-S, (R)$_n$-B-EP-S, (R)$_n$-B-EB-S, (R)$_n$-E-EP-E-S, (R)$_n$-E-EB-B-S, (R)$_n$-B-EP-B-S, (R)$_n$-B-EB-B-S, (R)$_n$-E-B-EB-S, (R)$_n$-E-B-EP-S, (R)$_n$-EB-EP-S, (R)$_n$-E-EB-EP-S, (R)$_n$-E-EP-EB-S, (R)$_n$-B-EB-EP-S, (R)$_n$-B-EP-EB-S, (R)$_n$-E-EP-E-EP-S, (R)$_n$-E-EP-E-EB-S, (R)$_n$-EP-B-EP-S, (R)$_n$-B-EB-B-EB-S, (R)$_n$-B-EB-B-EP-S, (R)$_n$-E-EB-B-EP-S, (R)$_n$-E-EP-B-EB-S, (R)$_n$-E-EP-E-EP-E-S, (R)$_n$-B-EP-B-EP-B-S, (R)$_n$-E-EP-E-EB-S, (R)$_n$-E-EP-E-EP-EB-S, (R)$_n$-E-EP-E-EP-E-S, (R)$_n$-E-EP-EB-EP-EB-B-S, (R)$_n$-E-EP-EB-EP-EB . . . -S, and the like. In the above notation, "-E-" denotes substantially crystalline polyethylene midblock. The above polymers optionally can be combined with a selected amount of one or more polymer or copolymer selected from the group consisting of poly(styrene-butadiene-styrene), poly(styrene-butadiene), poly(styrene-isoprene-styrene), poly(styrene-isoprene), poly(styrene-ethylene-propylene), poly(styrene-ethylene-propylene-styrene), poly(styrene-ethylene-butylene-styrene), poly(styrene-ethylene-butylene), poly(styrene-ethylene-propylene)n, poly(styrene-ethylene-butylene)n, maleated poly(styrene-ethylene-propylene-styrene), maleated poly(styrene-ethylene-butylene-styrene), maleated poly(styrene-ethylene-butylene), maleated poly(styrene-ethylene-propylene)n, maleated poly(styrene-ethylene-butylene)n, polystyrene, poly(alpha-methylstyrene), poly(o-methylstyrene), poly(m-methylstryene), poly(p-methylstyrene), polybutylene, poly (ethylene-propylene), poly(ethylene-butylene), polypropylene, polyethylene, polyethyleneoxide, poly (dimethylphenylene oxide), copolymers of trifluoromethyl-4,5-difuoro-1,3-dioxole and tetrafluoroethylene, tetrafluoroethylene, polycarbonate, ethylene vinyl alcohol copolymer, polyamide or polydimethylsiloxane; wherein said selected copolymer is a linear, branched, radial, or multiarm copolymer. The above applications, patents and publications are specifically incorporated herein by reference.

EXAMPLE I

Solid elastic gel bodies (having rigidities in the range of about: 100 to about 1,000 gram Bloom) are molded in the form of a cube, a rectangular solid, a rectangular parallelepiped, a prism, a tetrahedron, an octahedron, a spheroid, an oblate spheroid, or a prolate spheroid, a curved volume of a right cylinder, a curved volume of a right cone, an oblate spheroid, an oblate hemispheroid, a semi-hemispheroid, a quai-hemispheriod, a prolate, a spheroid, and a prolated hemispheroid, a gel rod (having gel rigidity of at least 300 gram bloom) is inserted into the solid gel bodies parallel along an axis passing through the center of mass of the elastic solid gel bodies, the gel rod is cut to the desired length, The elastic gel solid bodies are use for spinning while suspended by the gel rods.

EXAMPLE II

Solid elastic gel bodies with gel rod shapes extended from the gel bodies (having rigidities in the range of about 300 to about 1,500 gram Bloom) are molded in the form of a cube, a rectangular solid, a rectangular parallelepiped, a prism, a tetrahedron, an octahedron, a spheroid, an oblate spheroid, or a prolate spheroid, a curved volume of a right cylinder, a curved volume of a right cone, an oblate spheroid, an oblate hemispheroid, a semi-hemispheroid, a quai-hemispheriod, a prolate, a spheroid, and a prolated hemispheroid. The elastic gel solid bodies are use for spinning while suspended on the gel rods.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

What I claim is:

1. A gel toy for play comprising:
   (a) one or more elastic solid gel bodies and
   (b) one or more elastic gel rods having a selected rod length capable of storing and releasing torsion energy by twisting in one direction and reverse untwisting in the opposite direction about an axis along said rod length and threaded slidable through at least one suspension point about a selected axis of rotation of said gel bodies, said gel bodies capable of withstanding an elongation about said selected axis being perpendicular to said rod length of at least 50% during play.

2. A gel toy for play comprising:
   (a) a elastic solid gel body and
   (b) a elastic gel rod having a selected rod length capable of storing and releasing torsion energy by twisting in one direction and reverse untwisting in the opposite direction about an axis along said rod length and threaded slidable through at least one suspension point about a selected axis of rotation of said gel body, said gel body capable of withstanding an elongation about said selected axis being perpendicular to said rod length of at least 50% during play.

3. A gel toy for play comprising: at least one elastic solid gel body having at least one elastic gel rod of a selected rod length capable of storing and releasing torsion energy by twisting in one direction and reverse untwisting in the opposite direction about an axis along said rod length and said gel rod extending from opposite sides of an selected axis of rotation of said gel body, said gel body and gel rod capable of withstanding an elongation about said selected axis being perpendicular to said rod length of at least 50% during play.

* * * * *